(12) United States Patent
Sim

(10) Patent No.: US 6,588,857 B2
(45) Date of Patent: Jul. 8, 2003

(54) SOLENOID VALVE FOR BRAKE SYSTEMS

(75) Inventor: Tae-Yeong Sim, Kunpo (KR)

(73) Assignee: Mando Corporation, Kyungki-do (KR)

( * ) Notice: Subject to any disclaimer, the term of this patent is extended or adjusted under 35 U.S.C. 154(b) by 0 days.

(21) Appl. No.: 10/108,048

(22) Filed: Mar. 26, 2002

(65) Prior Publication Data

US 2003/0057767 A1 Mar. 27, 2003

(30) Foreign Application Priority Data

Sep. 21, 2001 (KR) ........................................ 2001-58532

(51) Int. Cl.$^7$ ................................................ B60T 8/36
(52) U.S. Cl. ................................ 303/119.2; 303/113.1; 303/117.1; 303/900; 303/68; 303/119.3; 251/129.14; 251/129.15; 335/220
(58) Field of Search ................................ 303/900, 901, 303/68, 61, 116.1–119.3, 113.2, 15, 18, 84.1, 84.2, 113.1; 251/129.14, 129.11, 129.07, 129.15, 129.22, 129.05, 129.01, 129.02, 117, 120, 30.01–30.05; 137/884, 625.65, 596.17, 599.16

(56) References Cited

U.S. PATENT DOCUMENTS

| | | | | |
|---|---|---|---|---|
| 5,556,175 A | * | 9/1996 | Hayakawa et al. | 303/119.2 |
| 5,788,344 A | * | 8/1998 | Friedow et al. | 303/119.2 |
| 6,082,833 A | * | 7/2000 | Hosoya | 303/900 |
| 6,084,493 A | * | 7/2000 | Siegel | 335/278 |
| 6,231,029 B1 | * | 5/2001 | Park | 251/129.15 |
| 6,276,764 B1 | * | 8/2001 | Park | 303/119.2 |
| 6,318,703 B1 | * | 11/2001 | Goossens et al. | 251/129.15 |
| 6,364,430 B1 | * | 4/2002 | Park | 303/119.2 |

FOREIGN PATENT DOCUMENTS

GB          2122709          * 1/1984

* cited by examiner

*Primary Examiner*—Douglas C. Butler
(74) *Attorney, Agent, or Firm*—Ladas & Parry

(57) ABSTRACT

A solenoid valve for brake systems is disclosed. This solenoid valve is preferably used as an outflow control NC-type solenoid valve mounted on the oil return line of an electro-hydraulic brake system (EHB). This solenoid valve comprises a hollow valve housing having a radial inlet passage, a plunger movably received in the bore of the valve housing so as to axially move in the bore in opposite directions, and a valve seat set in the bore of the valve housing, with an orifice axially formed in the valve seat such that the orifice is opened or closed by a control ball of the plunger. A radial oil port is formed on the sidewall of the valve seat so as to allow oil from the oil inlet passage of the valve housing to flow into the valve seat, and flow from the valve seat toward the plunger through the orifice. A plug closes the lower end of the bore of the valve housing, an oil outlet passage is axially formed in the sidewall of the valve housing such that the oil outlet passage communicates at its top end with the outlet of the orifice. This oil outlet passage feeds oil from the outlet of the orifice to a space defined under the bottom of the valve housing.

1 Claim, 4 Drawing Sheets

SOLENOID VALVE FOR BRAKE SYSTEMS

BACKGROUND OF THE INVENTION

1. Field of the Invention

The present invention relates, in general, to solenoid valves for brake systems of automobiles and, more particularly, to a solenoid valve used in the oil return line of an electro-hydraulic brake system.

2. Description of the Prior Art

Of a variety of brake systems recently proposed and used in automobiles, an electro-hydraulic brake system (EHB) is designed such that it senses pedal pressure, applied to the brake pedal by the driver's foot, through a pressure sensor, and controls oil pressures, which will be fed to the wheel brake cylinders, using a hydraulic modulator in response to the sensed pedal pressure.

As shown in FIG. 1, a conventional EHB comprises a pedal operation sensor 2, which senses the operation of a brake pedal 1. A master cylinder 4 is connected to the pedal 1, and has a pressure sensor 3 used for sensing pedal pressure applied to the pedal 1 by the driver's foot. The EHB also has an oil pump 6, which forcibly sucks oil from an oil tank 5 and outputs the oil under pressure. A accumulator 7 receives and stores the pressurized oil outputted from the pump 6. The EHB further includes an inflow control solenoid valve 10 and an outflow control solenoid valve 20. The inflow control solenoid valve 10 is mounted on an oil supply line extending from the accumulator 7 to a wheel brake cylinder 8, and controls a supplying of pressurized oil from the accumulator 7 to the brake cylinder 8. The outflow control solenoid valve 20 is mounted on an oil return line extending from the wheel brake cylinder 8 to the oil tank 5, and controls a returning of oil from the cylinder 8 to the tank 5. The EHB also has an emergency oil line 9, which directly feeds pressurized oil from the master cylinder 4 to the brake cylinder 8 and brakes the wheels to provide against emergencies, such as malfunction of the brake system. A solenoid valve 9a is mounted on the emergency oil line 9 to control the line 9.

The above conventional EHB is operated as follows: That is, when pedal pressure is sensed by the pressure sensor 3 of the master cylinder 4, an electronic control unit (ECU, not shown) opens the inflow control solenoid valve 10 in response to the pedal pressure, thus allowing pressurized oil to be fed from the accumulator 7 to the brake cylinder 8 and forming braking pressure in the cylinder 8. The accumulator 7 normally stores pressurized oil outputted from the oil pump 6, and maintains preset oil pressure. The operation of the oil pump 6 is controlled in response to a signal outputted from a pressure sensor 7a provided at the outlet of the accumulator 7. That is, the pressure sensor 7a senses oil pressure inside the accumulator 7, and outputs a signal to the ECU to selectively operate the pump 6.

At a time of removing the braking pressure from the brake cylinder 8, the inflow control solenoid valve 10 is closed, but the outflow control solenoid valve 20 is opened under the control of the ECU. Pressurized oil is thus returned from the brake cylinder 8 to the oil tank 5 provided at the master cylinder 4. During such an operation of the EHB, the inflow and outflow control solenoid valves 10 and 20 are alternately and repeatedly opened and closed under the control of the ECU, thus repeatedly and intermittently applying braking pressure to the brake cylinder 8 in the same manner as a conventional anti-lock brake system (ABS). The EHB thus prevents a slippage of the wheels on the road during a braking operation. In such conventional EHBs, a normal close-type solenoid valve (hereinbelow, referred to simply as "NC-type solenoid valve") is typically used as each of the inflow and outflow control solenoid valves 10 and 20. Such NC-type solenoid valves normally maintain their closed states, and are preferably used as the solenoid valves 10 and 20 of such an EHB in consideration of desired operational characteristics and operational efficiency of the solenoid valves 10 and 20.

FIG. 2 is a sectional view showing the construction of the inflow and outflow control solenoid valves 10 and 20 set in a modulator block of the conventional EHB. As shown in the drawing, the modulator block 30 of the EHB seats the inflow and outflow control solenoid valves 10 and 20 therein, and has a plurality of complex oil passages. When designing the modulator block 30, it is necessary to consider such complex oil passages, in addition to work efficiency while machining the block 30 and seating the valves 10 and 20 in the block 30, as well as the recent trend of compactness and smallness of the modulator blocks. The inflow and outflow control solenoid valves 10 and 20 are parallely installed in the modulator block 30 in consideration of such structural characteristics of the block 30. That is, the inflow and outflow control solenoid valves 10 and 20 are parallely and vertically installed in the modulator block 30 at left- and right-hand sides of FIG. 1, respectively.

During the operation of the EHB, pressurized oil outputted from the accumulator 7 is introduced into the inflow control solenoid valve 10 through an inlet oil passage 31 formed in the block 30 at a position under the valve 10. Thereafter, the inlet pressurized oil laterally flows from the inflow control solenoid valve 10 into a connecting passage 32 which communicates the two valves 10 and 20 to each other. The connecting passage 32 is also connected to another oil passage 33, which is connected to the wheel brake cylinder 8. Therefore, when the inflow control solenoid valve 10 is opened, pressurized oil outputted from the accumulator 7 is fed to the brake cylinder 8, thus forming braking pressure in the cylinder 8 and braking the wheels.

At a time of removing the braking pressure from the brake cylinder 8, the inflow control solenoid valve 10 is closed, but the outflow control solenoid valve 20 is opened under the control of the ECU. Pressurized oil is thus outputted from the brake cylinder 8, and flows into the outflow control solenoid valve 20 through a radial oil passage 21 of the valve 20, and is returned to the oil tank 5 of the master cylinder 4 through an outlet oil passage 34 formed in the block 30 at a position under the valve 20.

As described above, the inflow and outflow control solenoid valves 10 and 20 are NC-type solenoid valves. The operation of the inflow control valve 10 is easily controlled, but the control of the outflow control valve 20 is difficult due to the relation between the structural characteristics of the NC-type solenoid valves and the flowing direction of oil during the operation of EHB.

In a detailed description, when the plunger 11 axially moves upward to open the orifice 12 in the inflow control solenoid valve 10, pressurized oil from the inlet oil passage 31 passes upward through the open orifice 12 to flow into the radial oil passage 13 of the valve 10. In such a case, a large pressure difference is formed between the inlet and outlet of the orifice 12 at the initial stage of opening the orifice 12, and so oil pressure inside the orifice 12 acts in an upward direction wherein the plunger 11 moves to open the orifice 12. The plunger 11 is thus biased upward by the oil pressure. After a predetermined lengthy period of time, passes, the plunger 11 sufficiently opens the orifice 12, and so the pressure difference between the inlet and outlet of the orifice 12 is reduced to a predetermined level. In such a case, the flow rate of oil through the orifice 12 is increased, but the oil pressure inside the orifice 12 is reduced. The plunger 11 thus has a tendency to close the orifice 12. The inflow control solenoid valve 10 thus provides a "self-equilibrating effect". Due to such a self-equilibrating effect, it is easy to control the operation of the inflow control solenoid valve 10, wherein the oil flows upward from the bottom of the valve 10 to the radial oil passage 13. However, in the outflow control solenoid valve 20, oil flows downward from the radial oil passage 21 into the outlet oil passage 34. That is, the oil inside the outflow control valve 20 flows in a reverse direction to that of the inflow control valve 10, and so such a self-equilibrating effect is not rendered in the outflow control valve 20 even though the valve 20 has the same construction as that of the inflow control valve 10. It is thus difficult to control the operation of the outflow control solenoid valve 20. Such a problem experienced in the control of the operation of the outflow flow control solenoid valve 20 may be overcome by changing the oil passage structure in side the modulator block 30 such that the oil structure of the outflow control valve 20 becomes the same as that of the inflow control valve 10. However, it is almost impossible to practically design the oil passage structure of the block 30 to accomplish the above object, because such a change in the oil passage structure of the modulator block runs counter to the recent trend of compactness of the modular blocks.

SUMMARY OF THE INVENTION

Accordingly, the present invention has been made keeping in mind the above problems occurring in the prior art, and an object of the present invention is to provide a solenoid valve for brake systems, which is improved in its oil passage structure to render a self-equilibrating effect therein even though oil flows from the radial oil passage formed at the sidewall of the valve to the outlet oil passage formed in the modulator block at a position under the valve, and which is thus easily controlled during the operation of a brake system.

In order to accomplish the above objects, the present invention provides a solenoid valve for brake systems, comprising: a hollow valve housing having an oil inlet passage on its sidewall, with a bore axially defined in the valve housing; a plunger movably received in the bore of the valve housing so as to axially move in the bore in opposite directions by an electric force; a valve seat set in the bore of the valve housing, with an orifice axially formed in the valve seat such that the orifice is opened or dosed by an end of the plunger in accordance with an axial movement of the plunger, a radial oil port formed on the sidewall of the valve seat so as to allow oil from the oil inlet passage of the valve housing to flow into the valve seat through the radial oil port, and flow from the valve seat toward the plunger through the orifice of the valve seat; a plug dosing the lower end of the bore of the valve housing, thus allowing the oil to flow from the valve seat toward the plunger through the orifice; and an oil outlet passage axially formed in the sidewall of the valve housing in parallel to the bore such that the oil outlet passage communicates at its top end with the outlet of the orifice, the oil outlet passage feeding the oil from the outlet of the orifice to an area under the bottom of the valve housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 2:
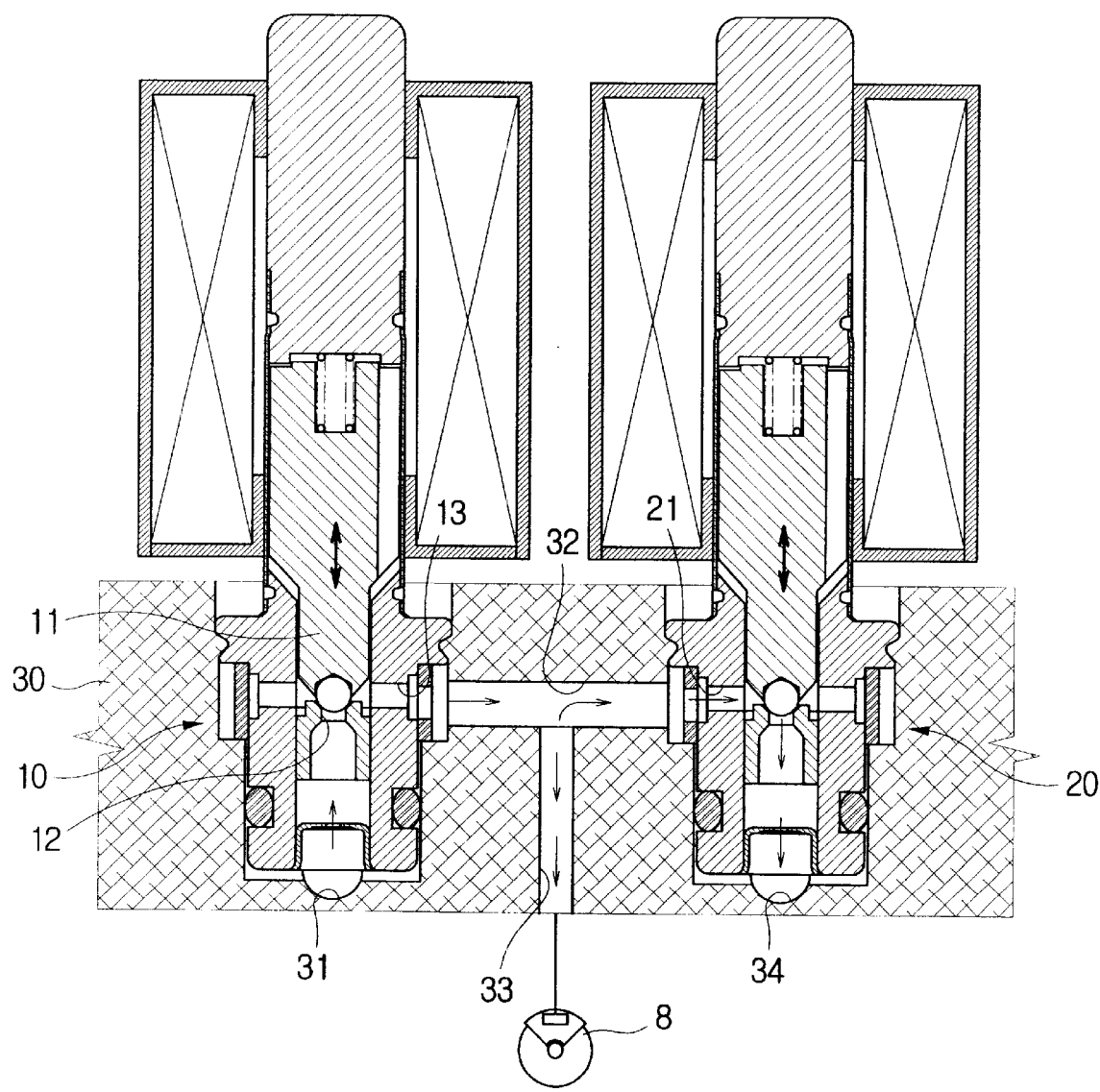
FIG. 2 is a sectional view showing the construction of the inflow and outflow control solenoid valves set in a modulator block of the conventional EHB.
Figure 3:
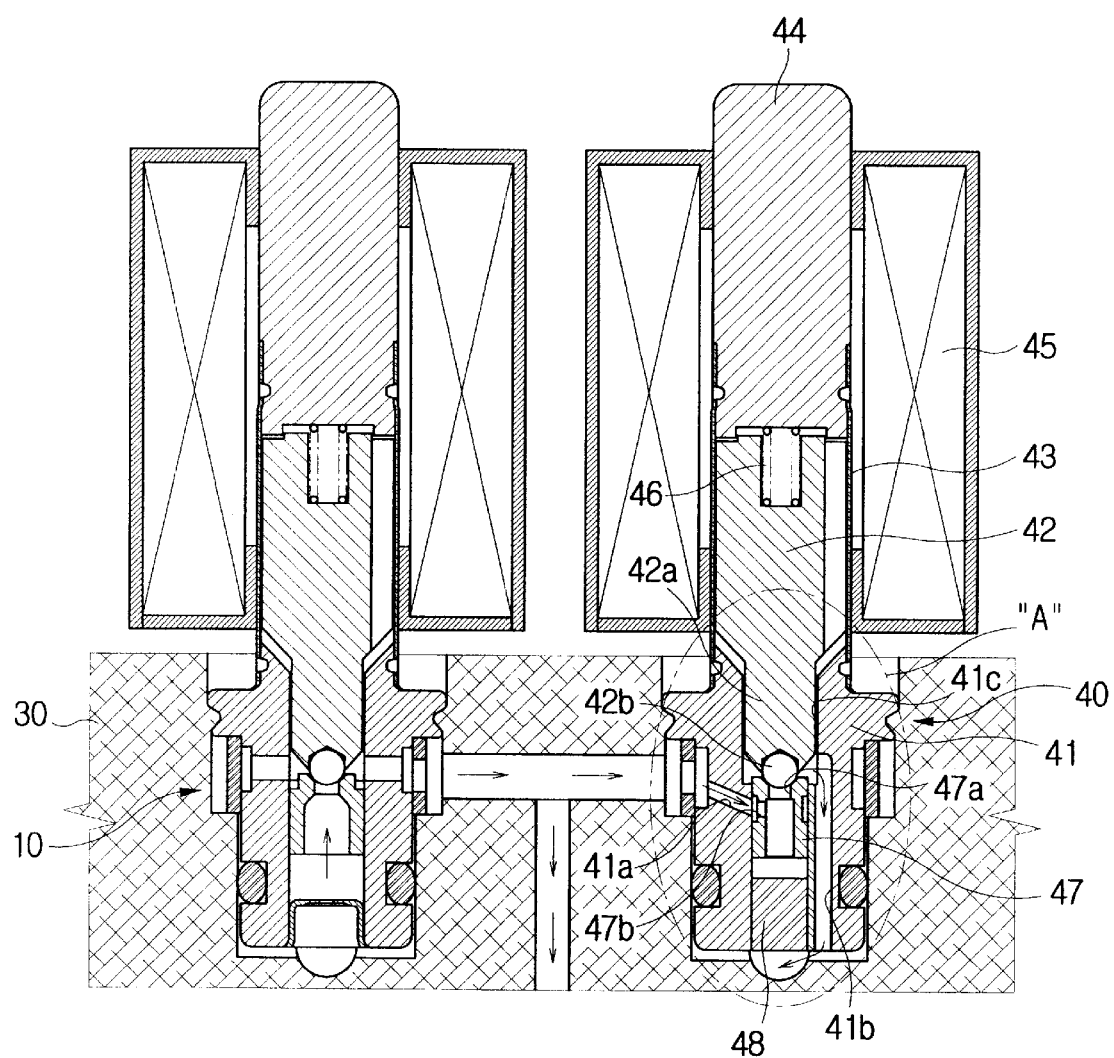
FIG. 3 is a sectional view showing the construction of the inflow and outflow control solenoid valves set in the modulator block of an EHB in accordance with the preferred embodiment of the present invention.

Reference now should be made to the drawings. As shown in FIG. 3, inflow and outflow control solenoid valves according to the preferred embodiment of this invention are set in the modulator block 30 of an EHB. In the present invention, the general shape of the modulator block and the inflow control solenoid valve remains the same as that described for the conventional embodiment of FIG. 2, but the construction of the outflow control solenoid valve is changed to accomplish the object of this invention. Those elements common to both the conventional embodiment and this invention will thus carry the same reference numerals.

Figure 1:
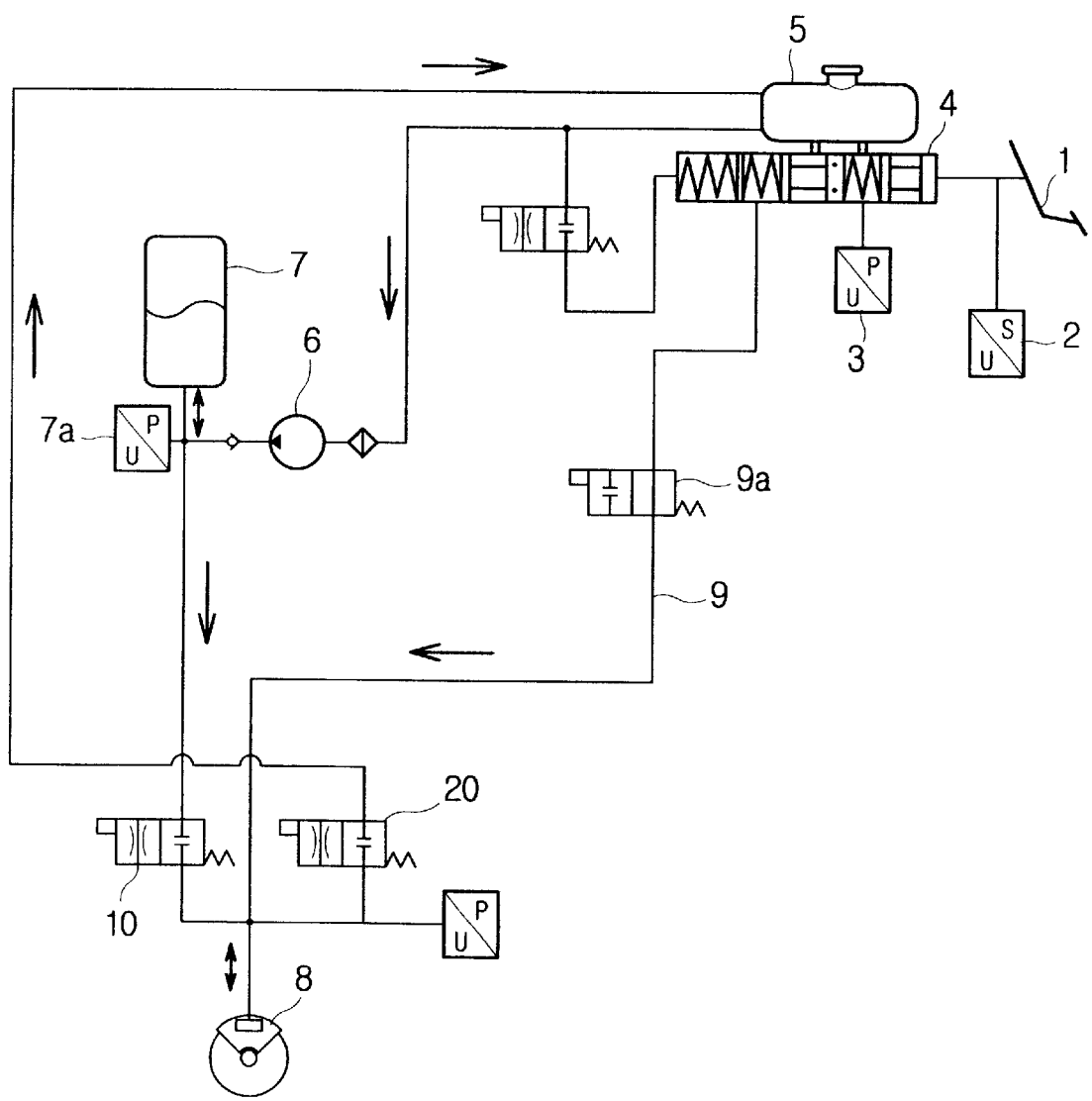
FIG. 1 is a circuit diagram of a conventional EHB.

The solenoid valve for brake systems of this invention is an NC-type solenoid valve, and used as the outflow control solenoid valve, which is set in the modulator block 30 of an EHB to control the oil return line of the EHB. As shown in FIG. 3, two NC-type solenoid valves 10 and 40 are set in the left- and right-hand sides of the modulator block 30, respectively. Of the two valves 10 and 40, the solenoid valve 10, which is set in the left-hand side of the modulator block 30, is an inflow control solenoid valve for controlling the oil supply line, which feeds pressurized oil from the accumulator 7 of FIG. 1 to the wheel brake cylinder 8. The NC-type solenoid valve 40, which is set in the right-hand side of the block 30, is an outflow control solenoid valve for controlling the oil return line, which returns oil from the brake cylinder 8 to the oil tank 5. Since the outflow control solenoid valve 40 is the valve of this invention, only the construction and operation of the valve 40 will be described in the following description.

Figure 4:
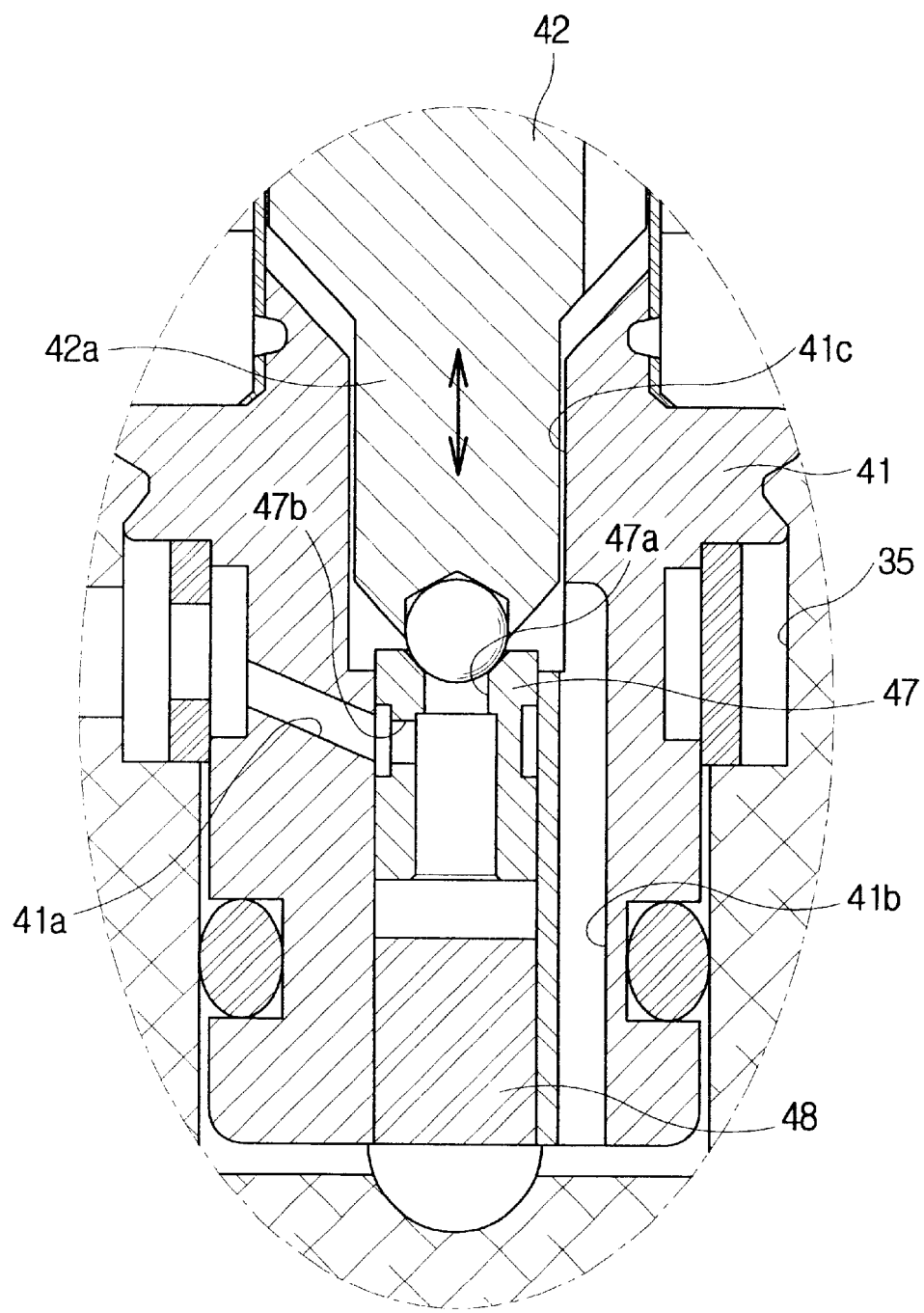
FIG. 4 is a sectional view showing the detailed construction of the portion "A" of FIG. 3.

In the same manner as the inflow control solenoid valve 10, the outflow control solenoid valve 40 comprises a hollow valve housing 41, which is forcibly fitted in a valve seating hole 35 of the modulator block 30 as shown in FIGS. 3 and 4. The valve 40 also has a cylindrical armature 42, which is integrated with a plunger 42a axially and movably received in the bore 41c of the hollow valve housing 41. A hollow cylindrical sleeve 43 is connected at the lower end thereof to the upper end of the valve housing 41, and axially and movably receives the body of the armature 42 therein. A magnetic valve core 44 is set in the upper end of the sleeve 43. The cylindrical armature 42 has an outer diameter corresponding to the inner diameter of the sleeve 43, and so the armature 42 axially moves along the internal surface of the sleeve 43 in opposite directions. The plunger 42a of the armature 42 is inserted into the bore 41c of the valve housing 41, and opens or closes the oil passage of the valve 40.

An exciting coil 45 is provided outside the sleeve 43 and valve core 44 for moving the armature 42 inside the sleeve 43. A return spring 46 is positioned between the armature 42 and the valve core 44 inside the sleeve 43, and elastically supports the armature 42 relative to the valve core 44 such that it normally biases the armature 42 in a direction toward the valve housing 41 when the exciting coil 45 is turned off.

A control ball 42b is set at the tapered lower end of the plunger 42a received in the bore 41c of the valve housing 41, and opens or closes the oil passage of the valve 40. A hollow cylindrical valve seat 47 is axially set in the bore 41c of the valve housing 41. This valve seat 47 has an orifice 47a at the center thereof, such that the orifice 47a is opened or closed by the control ball 42b in accordance with an axial movement of the plunger 42a inside the bore 41c. That is, when the plunger 42a integrated with the armature 42 is axially moved in the bore 41c, the control ball 42b opens or closes the orifice 47a, thus opening and closing the oil passage of the solenoid valve 40.

In the outflow control solenoid valve 40 of this invention, an oil inlet passage 41a is formed at the middle portion of the sidewall of the valve housing 41 as shown in FIG. 4. A radial oil port 47b is formed in the sidewall of the valve seat 47 to allow the oil inlet passage 41a to communicate with the orifice 47a of the valve seat 47. That is, the valve seat 47 has the radial oil port 47b on its sidewall, and so the oil inlet passage 41a of the valve housing 41 communicates with the orifice 47a of the valve seat 47 through the oil port 47b. The lower end of the bore 41c of the valve housing 41 is closed by a plug 48, and so pressurized oil, introduced into the valve seat 47 and the lower portion of the bore 41c through the oil inlet passage 41a, flows toward the plunger 42a through the orifice 47a. An oil outlet passage 41b is axially formed in the sidewall of the valve housing 41. Pressurized oil, discharged upward from the orifice 47a, flows to a space defined under the bottom of the valve housing 41 through the oil outlet passage 41b. In such a case, the oil outlet passage 41b axially extends in the sidewall of the valve housing 41 in parallel to the bore 41c, and communicates at its top end with the bore 41c at a position above the valve seat 47.

Due to such a structure of the outflow control solenoid valve 40, inlet oil, flowing from the oil inlet passage 41a formed at the middle portion of the sidewall of the housing 41, passes through the radial oil port 47b of the valve seat 47 to be introduced into the valve seat 47 and the lower portion of bore 41c. The oil is, thereafter, discharged from the valve seat 47 toward the plunger 42a through the orifice 47a, and flows downward through the oil outlet passage 41b to reach the space defined under the bottom of the valve housing 41.

The operational effect of the outflow control solenoid valve of this invention will be described herein below.

When the exciting coil 45 is turned off, the plunger 42a of the armature 42 is biased downward by the restoring force of the return spring 46, thus being fully inserted into the bore 41c of the valve housing 41. In such a case, the control ball 42b of the plunger 42a closes the orifice 47a of the valve seat 47.

When the exciting coil 45 is turned on, the plunger 42a of the armature 42 moves toward the valve core 44 by the electromagnetic force generated between the armature 42 and the valve core 44. The control ball 42b of the plunger 42a moves from the orifice 47a, thus opening the orifice 47a and allowing pressurized oil to flow through the open orifice 47a.

That is, oil flows into the valve seat 47 and the lower portion of the bore 41c through the oil inlet passage 41a of the valve housing 41 and the radial oil port 47b of the valve seat 47. The oil is, thereafter, discharged upward from the valve seat 47 and the lower portion of the bore 41c toward the plunger 42a through the open orifice 47a, and flows downward through the oil outlet passage 41b into the space defined under the bottom of the valve housing 41.

In a detailed description, when the orifice 47a of the valve seat 47 is opened, oil introduced into the valve seat 47 and the lower portion of the bore 41c through the oil inlet passage 41a passes upward through the open orifice 47a toward the plunger 42a, and flows downward through the oil outlet passage 41b to reach the space under the bottom of the valve housing 41. Therefore, the outflow control solenoid valve 40 provides a "self-equilibrating effect" in the same manner as the inflow control solenoid valve 10. Due to such a self-equilibrating effect, it is easy to control the operation of the outflow control solenoid valve 40. That is, a large pressure difference is formed between the inlet and outlet of the orifice 47a at the initial stage of opening the orifice 47a, and so oil pressure inside the orifice 47a acts in an upward direction wherein the plunger 42a moves to open the orifice 47a, thus biasing the plunger 42a upward. After a predetermined lengthy period of time passes, the plunger 42a sufficiently opens the orifice 47a. The pressure difference between the inlet and outlet of the orifice 47a is thus reduced to a predetermined level. In such a case, the flow rate of oil through the orifice 47a is increased, but the oil pressure inside the orifice 47a is reduced. The plunger 42a thus has a tendency to close the orifice 47a. The outflow control solenoid valve 40 provides the "self-equilibrating effect", and it is easy to control the operation of the outflow control solenoid valve 40.

As described above, the present invention provides a solenoid valve for brake systems. This solenoid valve is preferably used as an outflow control NC-type solenoid valve mounted on the oil return line of an EHB. In this valve, the oil passage structure is improved to have a self-equilibrating effect in the valve. That is, return oil is introduced into the valve housing of the solenoid valve through an oil inlet passage formed at the sidewall of the valve housing, and flows upward from the valve housing toward the plunger through an orifice, and flows downward through an oil outlet passage to reach a space defined under the bottom of the solenoid valve. This NC-type solenoid valve thus provides a self-equilibrating effect, even though it is used as an outflow control solenoid valve, and it is easily controlled during the operation of a brake system.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A solenoid valve for brake systems, comprising:

a hollow valve housing having an oil inlet passage on a sidewall thereof, with a bore axially defined in said valve housing;

a plunger movably received in said bore of the valve housing so as to axially move in the bore in opposite directions by an electric force;

a valve seat set in said bore of the valve housing, with an orifice axially formed in said valve seat such that the orifice is opened or closed by an end of said plunger in accordance with an axial movement of the plunger;

a radial oil port formed on a sidewall of said valve seat so as to allow oil from the oil inlet passage of the valve housing to flow into the valve seat through the radial oil port, and flow from the valve seat toward the plunger through said orifice of the valve seat;

a plug closing a lower end of the bore of said valve housing, thus allowing the oil to flow from the valve seat toward the plunger through the orifice; and an oil outlet passage axially formed in the sidewall of said valve housing in parallel to the bore such that the oil outlet passage communicates at a top end thereof with an outlet of said orifice, said oil outlet passage feeding the oil from the outlet of said orifice to an area under a bottom of said valve housing.

\* \* \* \* \*